United States Patent Office 3,647,626
Patented Mar. 7, 1972

3,647,626
PROCESS FOR THE PRODUCTION OF ADENOSINE BY MICROORGANISMS
Osamu Shoji, Ikeda-shi, Jouji Hironaka, Takatsuki-shi, and Hirotada Kotani, Sakai-shi, Japan, assignors to Dainippon Pharmaceutical Co., Ltd., Osaka, Japan
No Drawing. Filed Jan. 19, 1966, Ser. No. 521,522
Claims priority, application Japan, Jan. 25, 1965, 40/3,949
Int. Cl. C12d 13/06
U.S. Cl. 195—28 N
2 Claims

ABSTRACT OF THE DISCLOSURE

A process for the production of adenosine which employs microorganisms of genus Sarcina which are cultured in a medium containing sources of carbon, nitrogen, inorganic salts, and adenine and subsequently accumulating and separating the adenosine formed in the fermented medium.

---

The present invention relates to a process for manufacturing adenosine by microorganisms. Hitherto, adenosine has been obtained by a synthetic process or a process involving the decomposition of nucleic acids. However, where adenosine was synthetized by reaction of adenine with ribose, there was the disadvantage that the incidental production of various isomers reduced the yield of adenosine. On the other hand, the process involving the decomposition of nucleic acids was handicapped not only by the necessity of using expensive nucleic acids as raw material but also by the difficulty of removing the by-products of decomposing these acids. Recently a process (Japanese patent publication 1699/1962; U.S. Pat. 3,135,666; Agricultural and Biological Chemistry vol. 26, page 61, 1962) has been proposed which consists in converting nucleic acid bases into nucleosides by utilizing the biological function of the mutant strains of *Bacillus subtilis*.

According to the foregoing processes, however, hypoxanthine was brought forth as by-product, while the desired nucleosides were produced. Thus these processes had the shortcomings that separation of said by-product was a complicated and expensive process and that the desired nucleoside, i.e., adenosine, was not obtained with a high yield.

It has now been unexpectedly discovered that if adenosine-producing strains belonging to the genus Sarcina, for example, *Sarcina ureae*, *Sarcina hansenii* or mutant strains thereof, are cultured in a culture medium containing sources of carbon and nitrogen, inorganic salts and adenine, then those strains can change the adenine into adenosine with a high yield.

(1) FERMENTATION BACTERIA

The adenosine-producing bacteria which can be used in the fermentation process of the present invention are these belonging to the genus Sarcina which have the following bacteriological properties: they are spheres; they occur divisionally; they produce regular packets; and they are usually non-motile, gram-positive, and aerobic; they convert urea into ammonium carbonate. On the basis of the description given in Bergey's "Manual of Determinative Bacteriology," 7th edition (1957), the inventors have identified the aforementioned bacteria as those belonging to the species of *Sarcina ureae* or varieties thereof, including *Sarcina hansenii* which have entirely the same bacteriological properties as *Sarcina urea*. Moreover, the process of the present invention permits the use of the mutant strains of the *Sarcina ureae* or *Sarcina hansenii* obtained by the well-known mutation-induced means such as irradiation of ultraviolet- or X-rays. The typical strains which can be used in the process of the present invention are No. 15712 (ATCC No. 19202), No. 24005 (ATCC No. 19203) and No. 24012 (ATCC No. 19204). The cultures are deposited in the American Type Culture Collection, Inc., 12301 Parklawn Drive, Rockville, Md. 20852 under the foregoing numbers.

(2) CULTURE MEDIUM

The culture medium used in the process of the present invention contains sources of carbon and nitrogen, inorganic salts and adenine. An adequate source of carbon may include carbohydrates (for example, glucose and other monosaccharides, sucrose and other oligosaccharides, and hydrolysates of starch), and polyhydric alcohols (for example, glycerine). An appropriate source of nitrogen may comprise inorganic nitrogenous compounds such as ammonium sulfate, ammonium chloride, ammonium phosphate, ammonium nitrate, sodium nitrate, and potassium nitrate and organic nitrogenous compounds such as urea and amino acids. A suitable group of inorganic salts may consist of magnesium sulfate, potassium phosphate and calcium chloride. For nutrient sources for the culture medium, corn steep liquor, yeast extracts, polypeptone, meat extracts or protein hydrolystates may be used in substitution of the part or whole of the aforesaid nitrogen source.

It has also been discovered that for the smooth growth of bacteria, it is advantageous to prepare the culture medium in such a manner that it has a pH value of about 6 to 8, or preferably about 7 and also to maintain the pH value within this range during fermentation. For this purpose, it is possible to add pH-controlling agents such as calcium carbonate and aqua ammonia to the culture medium prior to or in the course of culture. The medium can be sterilized by heating it to, for example, 115° C. for 10 minutes.

(3) CULTURING METHOD

The seed broth can be prepared by inoculating the desired bacteria on the culture medium containing, for example, glucose and meat extracts and shake-culturing said medium at a temperature of, for example, 37° C. and for about 20 to 24 hours.

The advantageous process for carrying out fermention claimed in the present invention is to inoculate the seed on the culture medium described in paragraph (2) above and to maintain the temperature at about 35 to 38° C., or preferably about 37° C. and the pH value of said medium at 6 to 8 or preferably about 7, and to subject the culture medium to the submerged or shake-culture. It has been discovered that after about 72 to 96 hours of culture under such conditions, a maximum accumulation of adenosine is obtained.

(4) SEPARATION

After fermentation, the desired adenosine may be separated from the fermented medium by any method desired. Adenosine may be separated by, for example, a process which comprises removing growing cells by centrifuge or filter, passing the liquor through a column containing active carbon to adsorb adenosine and unreacted adenine, and thereafter selectively eluting the adsorbed materials by appropriate systems. For instance, an eluting solution consisting of methanol (100%), aqua ammonia (28%) and water (having a volumetric ratio of 60:5:35) is adequate to remove adenine from the active carbon to which adenine and adenosine have been adsorbed. Also, a solvent system composed of acetone and water in a volumetric ratio of 2:1 is suitable for the elution of the adsorbed adenosine from the active carbon. It is possible to separate adenosine from the adenosine-containing solution thus obtained by, for example, distilling off the solvent or adding a non-solvent agent (for example, ethanol).

The process of the present invention will be understood very clearly with reference to the examples which follow. It should be noted, however, that the present invention is not limited to these examples.

EXAMPLE 1

Several hundred kinds of microorganism separated from the nature were put to the following test. The microorganisms to be tested were each inoculated on a culture medium with a pH value of 7.0 which contains 3% of soy bean hydrolysate, 1% of calcium carbonate and 0.1% of adenine. The microorganism was aerobically cultured at a temperature of about 37° C. for 72 hours. After culture, the growing cells were centrifuged. The supernatant liquid was concentrated to one-tenth of the original volume and subjected to paper chromatography using a solvent consisting of 100 parts by volume of water-saturated n-butanol and 1 part by volume of 15 N aqua ammonia. After drying, the Rf value of the fraction absorbing ultraviolet rays was compared with that of the standard adenosine. It was discovered by this procedure that a substance equal to adenosine had been accumulated by the aid of the aforementioned three strains of bacteria marked No. 15712, No. 24005 and No. 24012. While these three strains belong to the genus Sarcina, they were identified more particularly as the species of Sarcina ureae or varieties thereof by bacteriological experiments given below:

Experimental data on bacteriological.—Properties of the aforementioned three strains Agar colonies:
    Form: Circular.
    Surface: Smooth.
    Edge: Entire.
    Elevation of growth: Capitate.
    Optical characters: Opalescent.
Agar slant:
    Growth: Abundant.
    Form of growth: Filiform.
    Lustre: Dull.
    Chromogenesis: White.
Broth:
    Surface growth: None.
    Clouding: None.
    Sediment: Compact.
Form: Pairs and packets.
Gram stain: +
Motility: −
Size: 1.1–1.5$\mu$.
Spore formation: +
Pigment milk: Slightly acid, no coagulation.
Gelatin liquefaction: −
Nitrate reduction: +
Indol formation: −
$H_2S$ formation: −
$NH_3$ formation: −
MR test: −
Starch hydrolysation: −
Catalase: +
Relation to $O_2$: Aerobic.
Optimum temperature: 37° C.
Urease: +

The above experimental data clearly indicate that the said three strains belong to the genus Sarcina because their type culture morphographically conforms to that of other species of the genus Sarcina. Also comparison of bacteriological properties based on the classification of the genus Sarcina contained in Bergey's "Manual of Determinative Bacteriology," 7th edition, 1957 shows that the properties of the strains subjected to the aforesaid experiments accord with those of Sarcina ureae. From this fact, the three strains under review have been identified as Sarcina ureae or varieties thereof.

EXAMPLE 2

A culture medium consisting of glucose and broth was introduced into a test tube in increments of 5 ml. The medium was sterilized at 115° C. for 10 minutes. Then the medium was inoculated with one loopful of the isolated strain No. 15712 of the Sarcina ureae. After shaking the medium at 37° C. for 20 hours, the mass was used as a seed culture solution. On the other hand, a culture medium composed of 5 g./dl. of glucose, 0.1 g./dl. of adenine, 0.5 g./dl. of polypeptone, 2 g./dl. of corn steep liquor, 0.2 g./dl. of ammonium sulfate, 0.05 g./dl. of potassium phosphite, 0.05 g./dl. of magnesium sulfate, and 1 g./dl. of calcium carbonate had previously been controlled to have a pH value of 7.0 by 1 N caustic soda solution and 1 N hydrochloric acid solution. The medium thus prepared was introduced into a 500 ml. flask in increments of 20 ml. Sterization was conducted at 115° C. for 10 minutes. To this medium was added the above-mentioned seed culture solution in increments of 4 ml. Culture was carried out by shaking the mixture at 37° C. for 90 hours. In this fermentation solution, the growth of adenosine, but not of hypoxanthine, was observed. 1 liter of said fermentation solution was centrifuged to remove growing cells. The filtrate was passed through a column containing active carbon to absorb adenosin and unreacted adenine to the carbon. After water washing, the absorbed adenine was eluted by an eluting solution composed of methanol (100%), aqua ammonia (28%) and water (having a volumeric ratio of 60:5:35). Then the absorbed adenosine was eluted by an eluting solution consisting of acetone and water in a volumeric ratio of 2:1. The eluted adenosine was cencentrated. 0.78 g. of crystalline adenosine was obtained which precipitated upon addition of ethanol.

EXAMPLE 3

The pH of a culture medium containing 5 w./v. percent (hereinafter the rotation percent means w./v. percent of glucose, 3% of acid hydrolyzed soy bean. 3% of calcium carbonate and 0.2% of adenine was controlled to 7.0. 8 liter of the medium was introduced into a 20 liter jar fermentor. Sterilization was carried out at 120° C. for 20 minutes. To this medium was added under sterilized condition 1.6 liter of a culture solution which had been prepared by inoculating the branch strain No. 24005 in a medium controlled to a pH value of 7.0 which contained 1% of glucose and 3% of soy bean hydrolysate, and by shake-culturing the medium at 37° C. for 24 hours. Small amounts of a silicon antifoaming agent were added to prevent bubbling, and volumes of air equal to those of the broth were introduced every minute. Culture was performed at 37° C. by rotating the fermentator at the rate of 300 r.p.m. About 16 g. (2 mg./ml.) of adenosine was obtained in about 90 hours. In this case no growth of hypoxanthine was observed.

We claim:
1. A process for manufacturing adenosine by microorganisms which comprises culturing adenosine-producing mutants or varieties of the genus Sarcina selected from the group consisting of the species Sarcina ureae and Sarcina hansenii, in a culture medium containing sources of carbon and nitrogen, inorganic salts and sources of adenine; accumulating the produced adenosine in said medium; and separating the accumulated adenosine from the fermented medium.

2. A process for manufacturing adenosine by microorganisms which comprises culturing adenosine-producing mutants or varieties of the genus Sarcina selected from a group consisting of the series *Sarcina ureae* and *Sarcina hansenii* in a culture medium containing sources of carbon and nitrogen, inorganic salts and sources of adenine maintained at a temperature of 35 to 38° C. and at a pH of 6 to 8; accumulaing the produced adenosine in said medium by maintaining said temperature and pH conditions of said medium for 72 to 96 hours; and separating the accumulated adenosine from the fermented medium.

References Cited

UNITED STATES PATENTS

| | | | |
|---|---|---|---|
| 3,111,459 | 11/1963 | Motozaki et al. | 195—28 N |
| 3,280,007 | 10/1966 | Ohmura et al. | 195—28 N |
| 3,298,923 | 1/1967 | Banno et al. | 195—28 N |

ALVIN E. TANENHOLTZ, Primary Examiner